United States Patent
Kikkawa

(10) Patent No.: US 6,665,032 B1
(45) Date of Patent: Dec. 16, 2003

(54) OPTICALLY COMPENSATED BEND MODE LCD DEVICE

(75) Inventor: Hironori Kikkawa, Tokyo (JP)

(73) Assignees: NEC Corporation (JP); NEC LCD Technologies, Ltd. (JP)

( * ) Notice: Subject to any disclaimer, the term of this patent is extended or adjusted under 35 U.S.C. 154(b) by 0 days.

(21) Appl. No.: 09/643,563

(22) Filed: Aug. 22, 2000

(30) Foreign Application Priority Data

Aug. 24, 1999 (JP) .......................................... 11-237186

(51) Int. Cl.[7] .......................................... G02F 1/1335
(52) U.S. Cl. ........................ 349/117; 349/119; 349/120
(58) Field of Search ........................... 349/117, 75, 118, 349/119, 120

(56) References Cited

U.S. PATENT DOCUMENTS

| | | | |
|---|---|---|---|
| 5,699,137 A | 12/1997 | Kishimoto | 349/119 |
| 5,721,600 A * | 2/1998 | Sumiyoshi et al. | 349/119 |
| 5,760,859 A * | 6/1998 | Bosma et al. | 349/75 |
| 5,798,809 A * | 8/1998 | Nakamura et al. | 349/119 |
| 5,847,789 A * | 12/1998 | Nakamura et al. | 349/99 |
| 5,990,997 A * | 11/1999 | Jones et al. | 349/120 |
| 5,995,180 A * | 11/1999 | Moriwaki et al. | 349/96 |
| 6,124,913 A * | 9/2000 | Mazaki et al. | 349/117 |
| 6,144,432 A * | 11/2000 | Hatanaka et al. | 349/119 |
| 6,281,952 B1 | 8/2001 | Okamoto et al. | 349/12 |
| 6,342,934 B1 | 1/2002 | Kameyama et al. | 349/98 |
| 6,362,862 B1 * | 3/2002 | Itoh et al. | 349/119 |

FOREIGN PATENT DOCUMENTS

| | | | |
|---|---|---|---|
| JP | 6-258635 | 9/1994 | G02F/1/1335 |
| JP | 6-294949 | 10/1994 | G02F/1/133 |
| JP | 6-294962 | 10/1994 | G02F/1/1335 |
| JP | 10-197862 | 7/1998 | G02F/1/1335 |
| JP | 2866540 | 12/1998 | G02F/1/1335 |

OTHER PUBLICATIONS

Chigrinov, LIquid Crystal Devices: Physics and Applications 1999, Artech House, pp. 54, 61, 248, 274.*

Wu, A biaxial film–compensated thin homogeneous cell for reflective liquid crystal display, Apr. 1998, American Institute of Physics, Journal of Applied Physics, pp. 4096–4100.*

Wu, Phase–Matched Biaxial Compensation Film for LCDs, 1995, SID Digest, pp. 555–558.*

Nishimura et al., The Performance of a Liquid–Crystal Polymer Film as an Optical Compensator for a Fast–Response STN–LCD, 1995, SID Digest, pp. 567–570.*

* cited by examiner

Primary Examiner—Toan Ton
Assistant Examiner—David Chung
(74) Attorney, Agent, or Firm—Hayes Soloway P.C.

(57) ABSTRACT

A LCD device includes a pair of phase compensating plates for controlling the overall retardation of the LCD device substantially at a constant between the substrates. A wavelength-dependent compensating plate is additionally provided for compensating the wavelength dependency of the overall retardation of the LCD device to improve the contrast ratio.

13 Claims, 16 Drawing Sheets

SPLAY ORIENTATION

TWIST ORIENTATION

BEND ORIENTATION

OPTICALLY COMPENSATED BEND MODE LCD DEVICE

BACKGROUND OF THE INVENTION (a) Field of the Invention

The present invention relates to an optically compensated bend (OCB) mode LCD device and, more particularly, to an OCB mode LCD device having an improved contrast ratio.

(b) Description of the Related Art

LCD devices are increasingly used in recent days while replacing the conventional CRT display device due to its advantages of smaller thickness, feasibility of larger capacity for display data etc.

A twisted nematic (TN) mode is generally employed as the operational mode of the LCD device. The TN mode is such that the direction of the axes (sometimes referred to as "directors" hereinafter) of the LC molecules are twist-rotated by 90 degrees in the direction perpendicular to the substrate surface between the front substrate and the rear substrate by using a perpendicular electric field which is normal to the substrate surface.

The TN mode has a disadvantage, however, in that the resultant LCD device has a narrow viewing angle, which hinders the picture on the screen from being clearly observed in the diagonal direction with respect to the perpendicular of the screen (substrate surface). In addition, in the case of a larger screen display device, a picture element appearing on the center of the screen and another picture element appearing on the periphery of the screen provide different image characteristics as observed from a point diagonally with respect to the perpendicular of the screen, whereby a correct image display is not possible.

JP-A-6-75116 describes a TN mode LCD device wherein a phase compensating plate is provided for enlarging the viewing angle. However, even this technique cannot solve the above problem to a desired extent or sufficiently compensate the twisted structure peculiar to the TN mode LCD device.

There is another technique of interest for improving the narrow viewing angle, called OCB mode wherein a LC cell having a bend orientation arrangement (or may be a parallel orientation arrangement) is combined with a phase compensating plate. The OCB mode is especially noticed due to its higher-speed response.

FIG. 1 shows a schematic chart showing orientation arrangements of directors of the LC molecules between the substrates, including a splay orientation arrangement, a twist orientation arrangement and a bend orientation arrangement, as viewed from the left of the drawing. Of these orientation arrangements, the bend orientation arrangement has a plane symmetry structure with respect to the central plane between the substrates, wherein the directors of the LC molecules reside in a standing posture, or are normal to the substrate surface, at the central area and "falls" toward both the substrates to be parallel to the substrate surfaces in the vicinity of the substrates.

The OCB mode is achieved by providing a LC layer having a bend orientation arrangement between the substrates and a phase compensating plate or plates for compensating the phase of the LC layer.

Known techniques for using the phase compensating plate in the LC device having the bend orientation arrangement include one using a phase compensating plate having a negative birefringence as described in JP-A-6-294962, one using a bi-axial phase compensating plate as described by Kuo in SID' 94 Digest, and one using a pair of phase compensating plates each having a negative birefringence and a hybrid orientation arrangement as described in JP-A-10-197862.

FIG. 2 shows the structure of the conventional OCB mode LCD device described in JP-A-10-197862, as mentioned above. A first substrate 21 mounts thereon either red, green or blue color filter 29R, 29G or 29B for each pixel area, on which an overcoat film 13, a common electrode 10 and a first orientation film 15 are consecutively formed.

A second substrate 22 mounts thereon a pixel electrode 27R, 27G and 27B either for red, green and blue color for each pixel area, on which a second orientation film 16 is formed.

First and second substrates 21 and 22 oppose each other with a LC layer 23 being sandwiched therebetween. On the outer surface of the first substrate 21, a first phase compensating plate 24 and a first polarizing plate 11 are consecutively formed. On the outer surface of the second substrate 22, a second phase compensating plate 25 and a second polarizing plate 12 are consecutively formed.

FIG. 3 shows orientations of the LC layer together with the axes of the polarizing plates 11 and 12 and the phase compensating plates 24 and 25, as viewed from the first substrate side. FIG. 4 shows schematic sectional view depicting the directors or the LC molecules and birefringences of the phase compensating plates as well as birefringence eclipses of the LC layer and the phase compensating plates during displaying a black color, wherein "ne" denotes the abnormal optical axis and "no" denotes a normal optical axis.

In FIG. 3, the orientations 101 and 102 of the first and second orientation films are formed in the same direction as the inclined directions 201 and 202 of the birefringences of the phase compensating plates so that the abnormal optical axis "ne" of the LC layer resides in the same direction as the abnormal optical axis "ne" of the birefringence of the phase compensating plates.

The polarizing axis 301 of the first polarizing plate is set at 45 degrees away from the orientation 101 of the first orientation film, and the polarizing axis 302 of the second polarizing plate is set at 90 degrees away from the polarizing axis of the first polarizing plate.

In FIG. 4, symbols LC1 to LC5 show a birefringence eclipse at the respective divided planes of the LC layer divided into ten layers, whereas symbols RF1 to RF5 show a birefringence eclipse at the respective divided planes of the phase compensating plate divided into five layers. In this example, it is assumed for simplicity that each layer has an equal thickness.

The longer axis of the birefringence LC1 in the central area of the LC layer is normal to the substrate surface, and the longer axis of the birefringence LC5 of the LC layer in the vicinity of the orientation layer is parallel to the substrate surface, with the axes of the birefringences having intermediate numbers LC2, LC3, LC4 resides between those directions. On the other hand, the longer axis of the birefringence RF1 of the phase compensating plate at the outer surface thereof is normal to the substrate surface and the longer axis of the birefringence RF5 at the inner surface is parallel to the substrate surface.

The negative birefringence of the phase compensating plate oriented in a hybrid orientation arrangement corresponds to the birefringence of the LC layer when the LC layer displays a black color. The birefringences LC1, LC2, . . . , LC5 of the LC layer correspond to the birefringences RF1, RF2, . . . , RF5, respectively, of the phase compensating plate for effecting compensation of retardation.

The overall retardation "R" of the LCD device can be expressed by equation (1) based on the refractive indices and the thicknesses of the LC layer and the phase compensating plate:

$$R=Rlc+Rrf=[(nlcx\times dlc+nrfx\times drf)-(nlcy\times dlc+nrfy\times drf)] \quad (1)$$

wherein nlcx, nlcy, nrfx and nrfy are the refractive indices of the LC layer in x-direction, the LC layer in y-direction, the phase compensating plate in x-direction and the phase compensating plate in y-direction, respectively, all of these being observed from a single point, and wherein dlc and drf are the thicknesses of the LC layer and the phase compensating plate, respectively.

Rlc and Rrf are retardations of the LC layer and the phase compensating plate, and are expressed by;

$$Rlc=(nlcx-nlcy)\times dlc, \text{ and}$$

$$Rrf=(nrfx-nrfy)\times drf.$$

If the birefringences LC5 and RF5, for example, are observed from the front, birefringence LC5 has a larger refractive index in x-direction whereas birefringence RF5 has a larger refractive index in y-direction, as shown in FIG. 5A. Thus, both the birefringences LC5 and RF5 compensate one another to obtain an equal refractive index for x-direction and y-direction as a whole, thereby providing substantially zero for the retardation.

On the other hand, if the birefringences LC5 and RP5 are observed diagonally along the rubbing direction of the orientation film, as shown in FIG. 5B, the birefringence LC5 is smaller than that observed from the front, whereas the birefringence RF5 is larger than that observed from the front. Thus, both the birefringences LC5 and RF5 as observed diagonally also compensate one another to thereby provide substantially zero for retardation.

As in the case of the combination of birefringences LC5 and RF5, other combinations LC1 and RF, LC2 and RF2, . . . also compensate one another, whereby the OCB mode LCD device provides substantially zero for retardation to display a correct black color even viewed diagonally and thus provides a wider viewing angle.

The electric characteristics of the OCB mode LCD device will be described hereinafter. It is assumed that the product $\Delta n\times d$ of the birefringence factor $\Delta n$ and the cell thickness "d" is between 790 nm and 1190 nm, as described in JP-A-10-197862. This product range occurs when all the LCD molecules reside parallel to the substrate surface. On the other hand, the bend orientation arrangement occurs when all the LC molecules in the central area are normal to the substrate surface, whereby the retardation Rlc of the LC layer is ⅓ to ½ to that range. The retardation Rrf of the phase compensating plate resides at 20 to 50 nm as viewed from the front in consideration of the retardation of the commercial phase compensating plate having a negative birefringence and a hybrid orientation arrangement. The retardation Rrf as used herein means such provided by a separate phase compensating plate.

Since the longer axis for the birefringence of the phase compensating plate is normal to the longer axis for the birefringence of the LC molecules, as shown in FIGS. 3 and 4, the retardation of the phase compensating plate acts in a negative direction, with the longer axis for the birefringence of the LC molecules being in the positive direction, as will be understood from equation (1). Thus, the overall retardation "R" of the LCD device resides between 250 nm and 300 nm when the LCD device exhibits a white color.

In a LCD device using the birefringence, the intensity of transmitted light "I" is represented by:

$$I=A\times(\sin(2\theta))^2\times\sin(R\pi/\lambda))^2 \quad (2)$$

wherein A, θ, R and λ are a constant, the angle between the polarizing axis of the polarizing plate and the axis of LC layer, the overall retardation and the wavelength of transmitted light.

With the increase of the voltage applied to the LC layer to thereby decrease the retardation of the LC layer, the overall retardation becomes small and eventually become zero at a higher applied voltage whereby a black color is displayed.

In the conventional OCB mode LCD device, there is a drawback especially in displaying a color image, as will be detailed below. If the overall retardation R is zero or an integral multiple of the wavelength of the transmitted light, the LCD device assumes a black color. However, the conventional LCD device has a higher brightness during displaying a black color whereby a contrast ratio is reduced, as detailed below.

Both the retardations of the LC layer and the phase compensating plate are not constants for different wavelengths, i.e., have wavelength dependencies. For example, if a LC cell having a bend orientation arrangement is formed by using the LC material and the conditions such as shown in table 1, the overall retardation exhibits a wavelength dependency and an applied-voltage dependency, such as shown in FIG. 6.

TABLE 1

| | |
|---|---|
| birefringence $\Delta_n$ of LC layer | 0.11 |
| dielectric anisotropy $\Delta \epsilon$ of LC layer | 4 |
| pre-tilt | 4 degrees |
| k11 | 10.2 |
| k22 | 7.0 |
| k33 | 17.0 |
| gap between substrates | 5.5 μm | wherein k11, k22 and k33 are splay viscosity/elasticity factor, twist viscosity/elasticity factor and bend viscosity/elasticity factor, respectively.

On the other hand, the phase compensating plate having a negative birefringence and a hybrid orientation arrangement exhibits a wavelength dependency of the retardation as shown in FIG. 7. A pair of such phase compensating plates each having the characteristic of FIG. 7 exhibit an overall retardation in the OCB mode LCD device, such as shown in FIG. 8.

In this case, an applied voltage of 7 volts provides a minimum brightness to exhibit a black color. The minimum brightness is 1.5 folds the brightness provided by a conventional TN mode LCD device including a phase compensating plate having a negative birefringence and a hybrid orientation arrangement, thereby exhibiting a poor contrast. This is because the overall retardation is large and light leaks in the wavelength bands between 400 nm and 500 nm and between 600 nm and 800 nm.

The TN mode LCD device including a phase compensating plate having a negative birefringence and a hybrid orientation arrangement does not exhibit such a phenomenon or a poor contrast.

FIG. 9 shows a schematic chart showing birefringences of the LC layer and the phase compensating plate in a TN mode LCD device exhibiting a black color, whereas FIG. 10 shows the directions of the axes of the LC layer, phase compensating plate and the polarizing plate in the TN mode LCD device. FIG. 11 is a schematic chart of birefringence eclipse as viewed from the front of the TN mode LCD device, wherein the horizontal axis 501 and the vertical axis 502 are transmission axes of the polarizing plates, symbol RF corresponds to the birefringence eclipse of the phase compensating plate and symbol LC corresponds to the birefringence eclipse of the LC layer.

The light which is incident on the TN mode LCD device passes the phase compensating plate without the influence by the birefringence thereof to all the wavelengths of light because the main axis of the birefringence of the phase compensating plate disposed on the incident side is aligned with the polarizing axis of the polarizing plate. That is, the plane (or linearly) polarized light aligned with the polarizing axis of the polarizing plate on the incident side reaches the TN cell as it is. If the LC molecules are applied with a suitable high voltage to "stand", the light passes the LC layer to reach the phase compensating plate on the outgoing side (opposite side) without generating a phase difference between wavelengths. Since the birefringence axis of the phase compensating plate on the opposite side is normal to the polarizing axis of the polarizing plate on the incident side, the light also passes the phase compensating plate on the opposite side without the influence by the birefringence thereof. Thus, the incident light passes the polarizing plate on the opposite side as the original plane polarized light irrespective of the wavelength thereof, whereby a black color is displayed on the LCD device.

FIG. 12 shows a schematic chart of the birefringence of the OCB mode LCD device, wherein numerals and symbols similar to FIG. 11 are used to designate similar elements. Since the polarizing axis 601 of the polarizing plate on the incident side and the birefringence axis of the phase compensating plate have a specified angle (45 degrees in this case) therebetween, the light is affected by the birefringence for any color to be displayed, whereby the wavelength dependency of the birefringence affects the display. This problem is common to a LCD device including a phase compensating plate having a hybrid orientation arrangement and a negative birefringence and a LCD device including a phase compensating plate having a bi-axial birefringence.

FIG. 13 shows a schematic chart of the birefringences of the LC layer and the phase compensating plate in a LCD device including a LC cell having a parallel orientation arrangement. This chart is similar to the chart of FIG. 4 except that a point symmetry arrangement is employed in FIG. 13 with respect to the center of the LC layer instead of the plane symmetry arrangement, whereby the LCD device also suffers from a similar problem.

SUMMARY OF THE INVENTION

It is therefore an object of the present invention to provide a OCB mode LCD device capable of solving the above problem of poor contrast.

The present invention provides a LCD device including first and second substrates opposing each other, a LC layer sandwiched therebetween for allowing transmission of light therethrough, an electrode assembly for defining a plurality of pixel areas in the LC layer, a phase compensating plate mounted by either one of the first and second substrates, a wavelength-dependent compensating plate mounted by either one of the first and second substrates, the wavelength compensating plate compensating a wavelength dependency of an overall retardation effected by the LC layer and the phase compensating plate to thereby obtain a substantially constant retardation with respect to different wavelengths of the transmitted light.

In accordance with the LCD device of the present invention, since the wavelength dependency of the overall retardation of the LCD device is compensated by the wavelength-dependent compensating plate, the resultant LCD device has a higher contrast ratio, thereby improving the image quality of the LCD device.

In the above configuration, both the first and second substrates may mount thereon respective phase compensating plates, and also may mount thereon respective wavelength-dependent compensating plates independently of the phase compensating plates. In addition, a plurality of phase compensating plates may be mounted by one of the first and second substrates.

The above and other objects, features and advantages of the present invention will be more apparent from the following description, referring to the accompanying drawings.

BRIEF DESCRIPTION OF THE DRAWINGS

FIG. 9 is a schematic chart showing the birefringence of the LCD layer and the phase compensating plate in a TN mode LCD device during displaying a black color.

PREFERRED EMBODIMENT OF THE INVENTION

Figure 1:
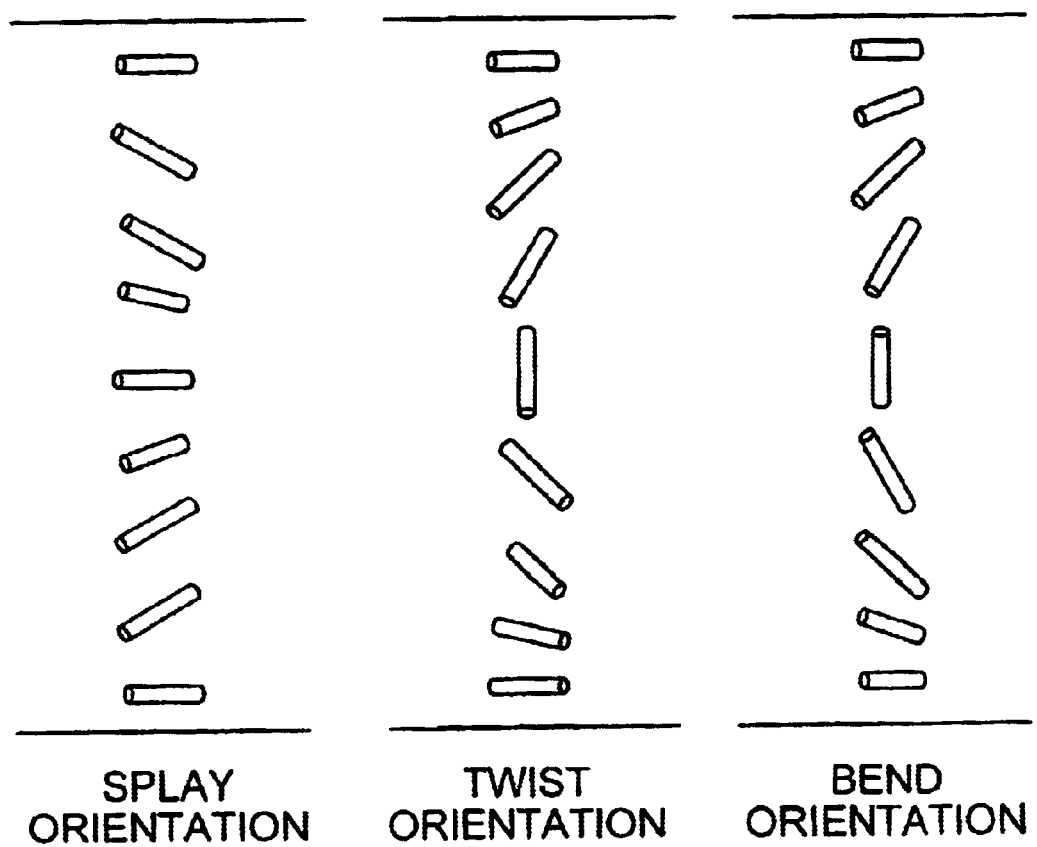
FIG. 1 is a schematic chart showing fundamental orientation arrangements of directors in a nematic LC layer.
Figure 2:
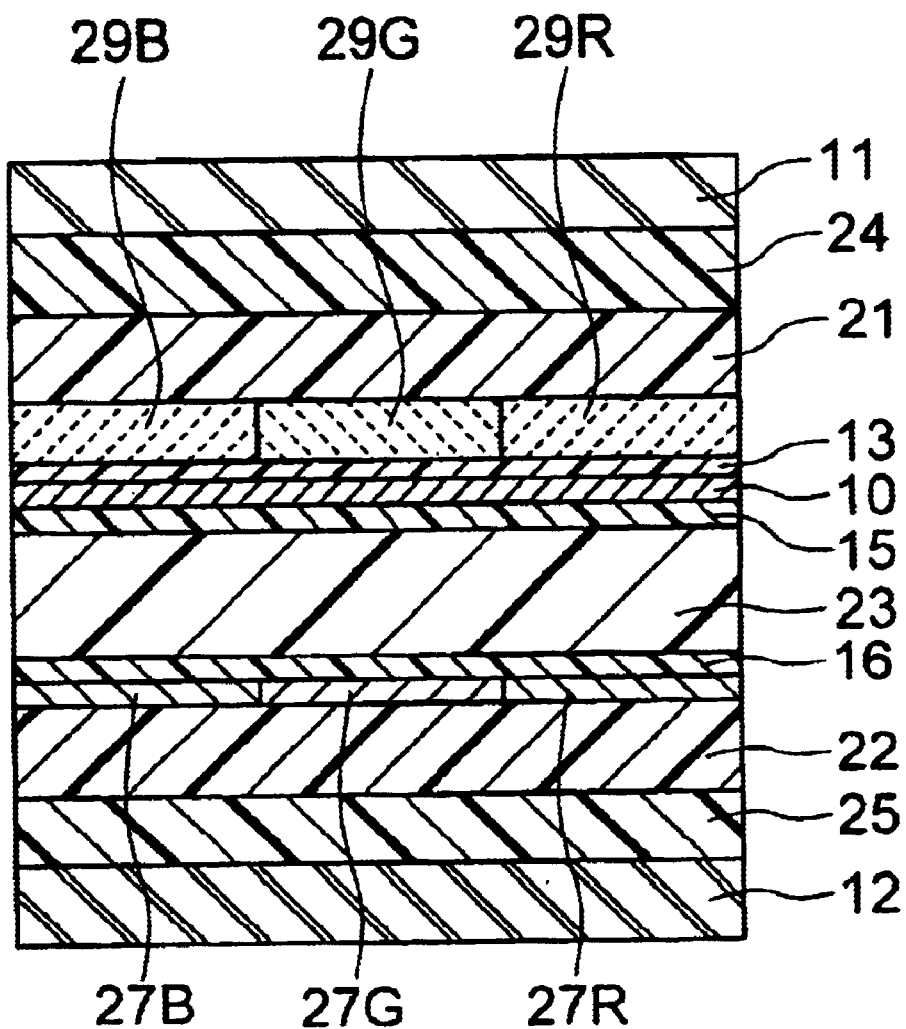
FIG. 2 is a sectional view of a conventional OCB mode LCD device including a pair of phase compensating plates each having a hybrid orientation arrangement and a negative birefringence.
Figure 3:
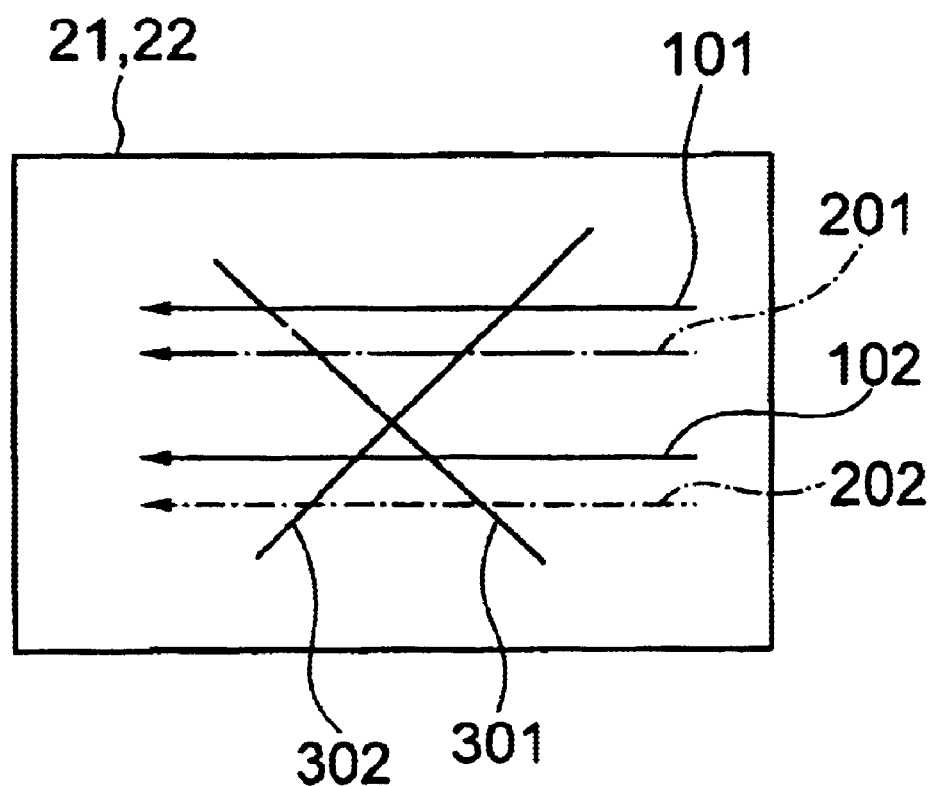
FIG. 3 is a schematic chart of axial directions of the LC layer, phase compensating plates and polarizing plates.
Figure 4:
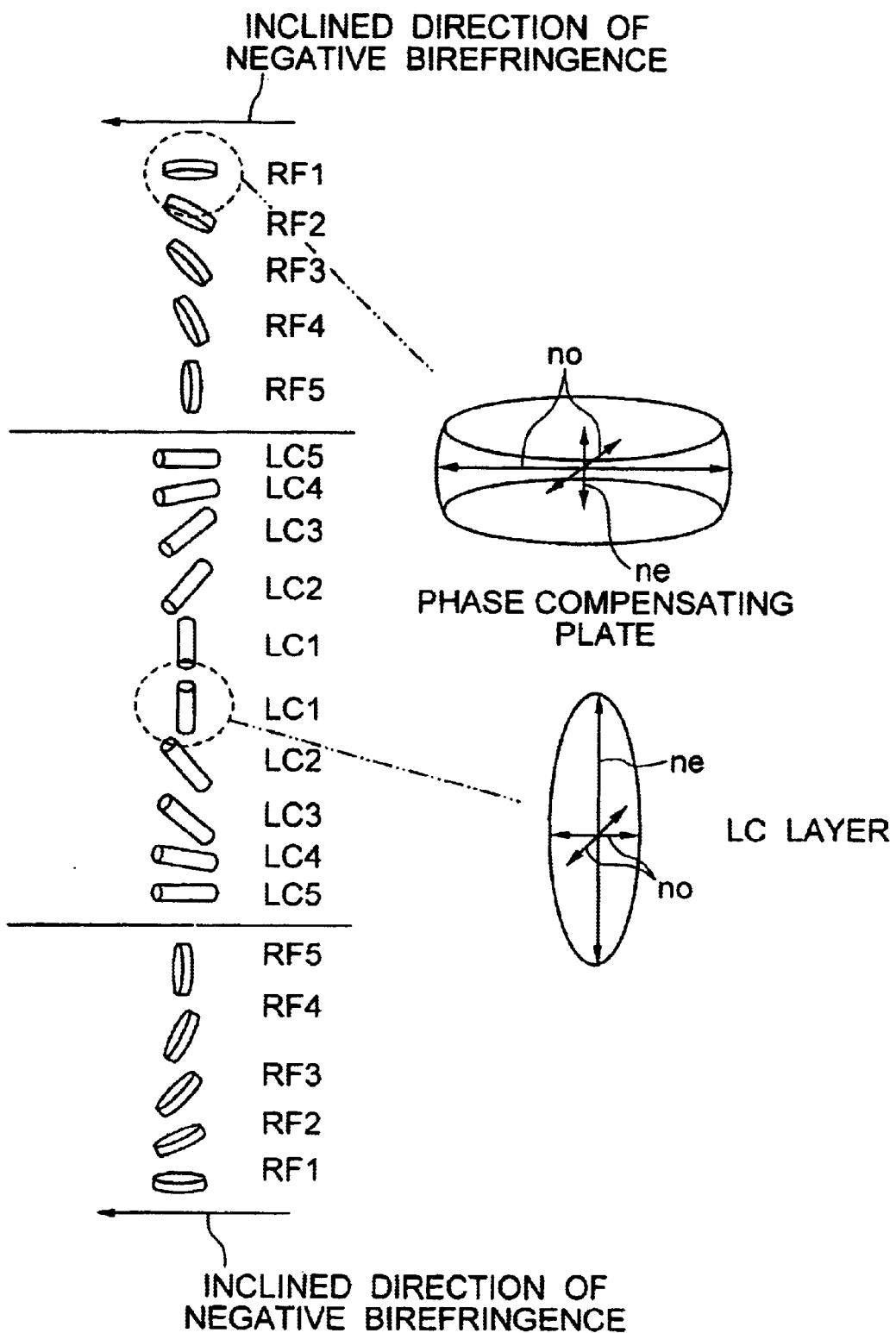
FIG. 4 is a schematic chart showing arrangements of the birefringences of the LC layer and the phase compensating plate in a conventional OCB mode LCD device during display of a black color.
Figure 5A:
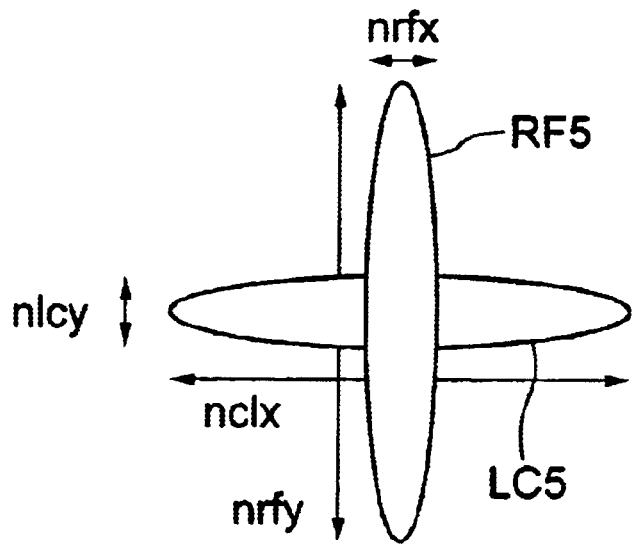
FIGS. 5A and 5B are schematic charts showing the birefringences of the LC layer and the phase compensating plate, as viewed from the front and diagonally, respectively.
Figure 5B:
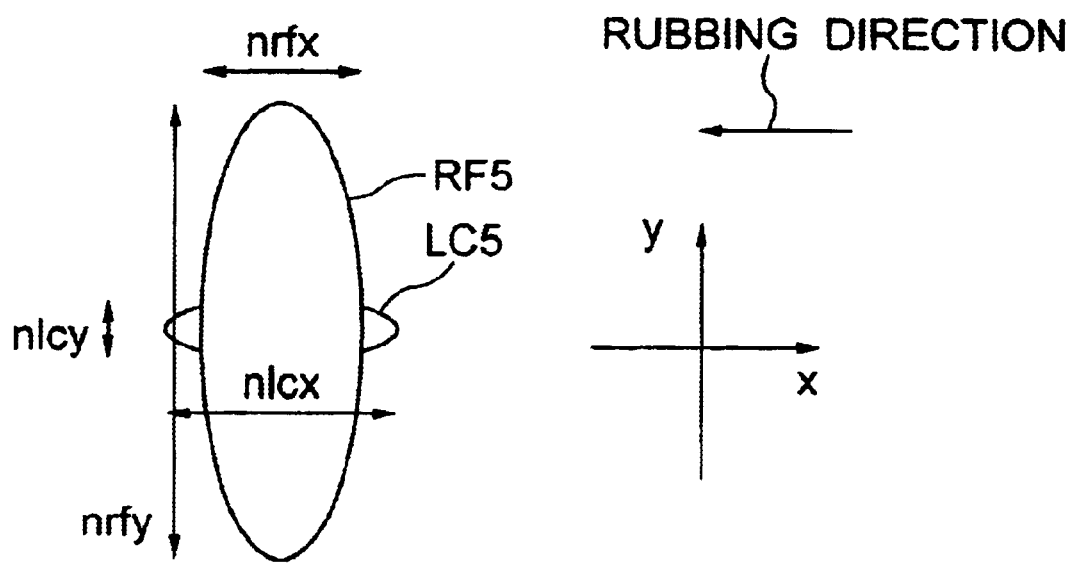
Figure 6:
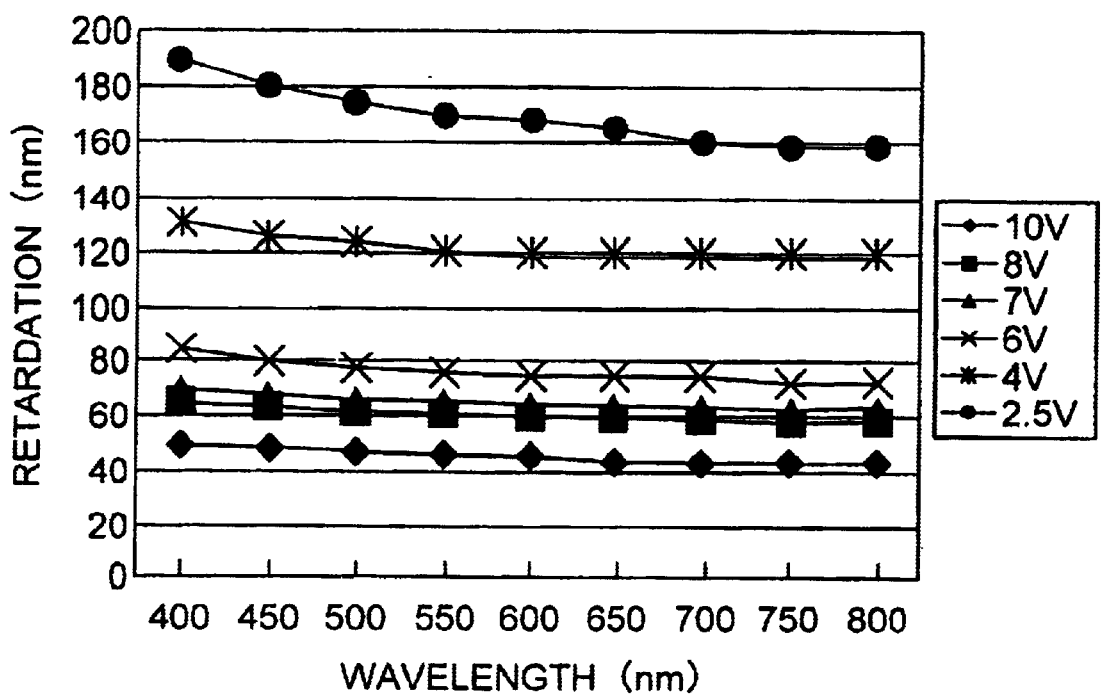
FIG. 6 is a graph showing a wavelength dependency of the retardation, with the cell voltage applied to a LC cell having a bend orientation arrangement being a parameter.
Figure 7:
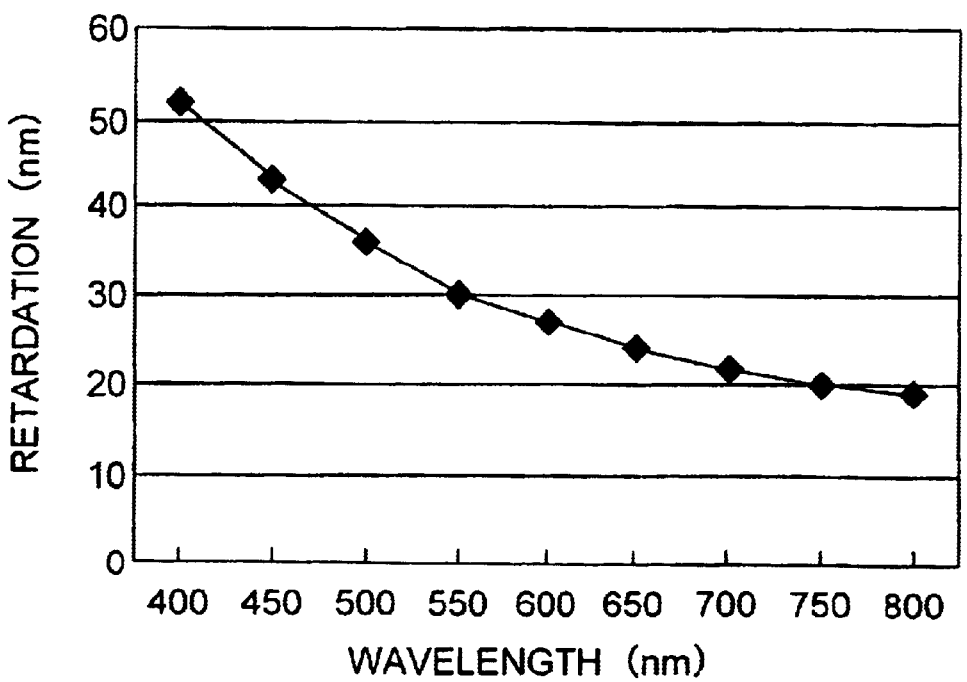
FIG. 7 is a graph showing a wavelength dependency of the retardation, with the cell voltage applied to a LC cell having a hybrid orientation arrangement being a parameter.

Now, the present invention is more specifically described with reference to accompanying drawings, wherein similar constituent elements are designated by related reference numerals throughout the drawings.

Figure 14:
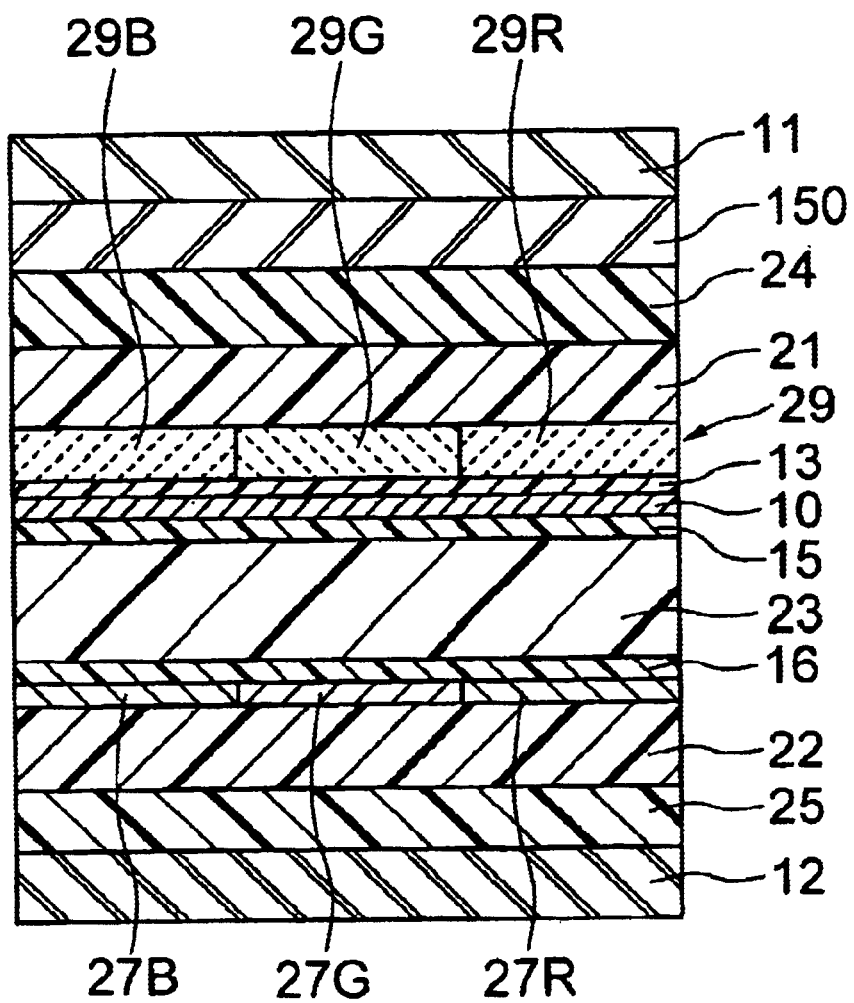
FIG. 14 is a sectional view of an OCB mode LCD device according to an embodiment of the present invention.

Referring to FIG. 14, an OCB mode LCD device according to an embodiment of the present invention includes first and second substrates 21 and 22 opposing each other, and a LC layer 23 sandwiched therebetween to form a LC cell, the LC cell forming a plurality of pixels arranged in a matrix along the screen of the LCD panel. The first substrate 21 mounts on the inner surface thereof color filters 29 including red, green and blue color filters 29R, 29G and 29B for respective pixels, and an overcoat layer 13, a common electrode layer 10 and an orientation film 15 which are consecutively formed on the color filter.

The second substrate 22 mounts on the inner surface thereof pixel electrodes 27R, 27G and 27B corresponding to the respective color filters 29R, 29G and 29B, Each of the first and second substrates 21 and 22 mounts on the outer surface therefor a bi-axial phase compensating plate 24 or 25 having a hybrid orientation arrangement and a negative birefringence. The first substrate 21 further mounts a wavelength-dependent compensating plate 150 implemented by a uni-axial phase contrast plate, and a polarizing plate 11, which are consecutively formed on the phase compensating plate 24. The second substrate 22 mounts on the phase compensating plate 25, which is formed on a polarizing plate 12. Each pixel electrode 27R, 27G and 27B is associated with a switching transistor (not shown) for selectively applying data voltage to the corresponding pixel electrode.

The LCD device of the present embodiment is fabricated by the process as detailed below. The OCB mode LCD device is fabricated based on the conditions tabulated in table 1. First, color filters are formed on the first substrate 21 by patterning a polyimide-based photosensitive resin film, wherein a red, green or blue pigment is dispersed, while iterating three photolithographic steps.

The material for the red color filter 29R has a peak transmission at a 640-nm wavelength, the material for the green color filter 29G has a peak transmission at a 540-nm wavelength, and the material for the blue color filter has a 430-nm wavelength. This configuration improves the efficiency of light power by adapting the materials with the peak wavelength of the fluorescent tube used for the light source. The peak wavelengths may be changed by manipulating the light source or the white balance. For example, the peak wavelength for the blue color may be set in the range of 380 to 488 nm, which the human eyes are considered to judge as a blue color.

Subsequently, a polyimide-based transparent polymer is spin-coated thereon, followed by a thermally curing step to form the overcoat film 13. The overcoat film 13 is used for planarizing the irregular surfaces of the color filters to improve the orientation of the LC layer.

An ITO (indium-tin-oxide) film is then deposited by sputtering, followed by patterning thereof to form the common electrode pattern 10. Thereafter, polyimide is applied to a thickness of about 50 nm by using a printing technique, followed by thermal curing to form the orientation film 15.

On the second substrate 22, an ITO film is formed and subjected to patterning, to form pixel electrodes 27R, 27G and 27B at respective pixels. Polyimide is then applied to a thickness of about 50 nm by a printing technique, followed by thermal curing to form the orientation film 16, which is then subjected to a rubbing treatment.

Subsequently, polyxner beads having a diameter corresponding to the desired gap between the substrates 21 and 22 are scattered along the substrate surface. The first and second substrates 21 and 22 are then disposed to oppose each other, with the directions of the rubbing treatment on both the orientation films being aligned, and are bonded together to form a gap therebetween. The gap is filled with nematic liquid crystal by injection. Then, the substrates 21 and 22 are sandwiched between a pair of bi-axial phase compensating plates 24 and 25 each having a hybrid orientation arrangement and a negative birefringence.

Then, a uni-axial wavelength-dependent compensating plate 150 made of polycarbonate is bonded onto the phase compensating plate 24, with the longer axis of the birefringence thereof being aligned with the orientation of the LC molecules. In an alternative, the wavelength-dependent compensating plate 150 may underlie the phase compensating plate 24 or may overlie the phase compensating plate 25. The wavelength-dependent plate 150 may be formed on the inner surface of the first or second substrate 21 or 22 instead. The wavelength-dependent plate 150 may be made of liquid crystal polymer.

Subsequently, the polarizing plates 11 and 12 are bonded onto the wavelength-dependent plate 150 and the phase compensating plate 25, respectively.

Figure 15:
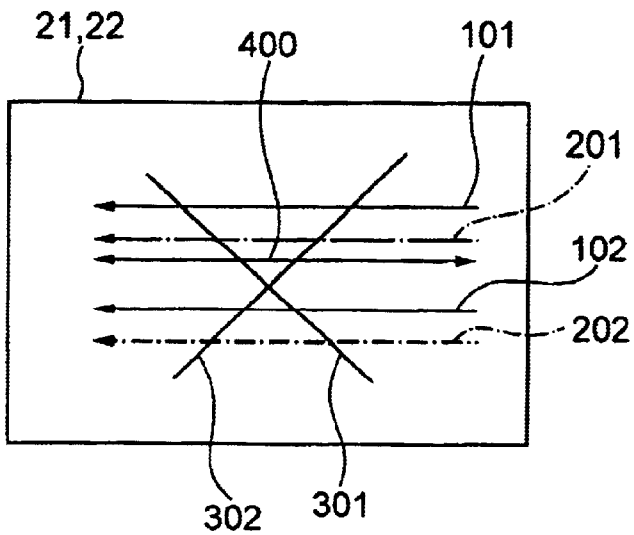
FIG. 15 is a schematic chart of the axial directions of the LC layer, the phase compensating plates, the polarizing plates and the wavelength-dependent compensating plate in the LCD device of FIG. 14 as viewed from the front.

Referring to FIG. 15, there is shown relationship between the directions of the LC orientation, the longer axis of the birefringence of the wavelength-dependent compensating plate and the polarizing axis of the polarizing plates. The orientation 101 of the LC molecules in the vicinity of the first substrate 21, the orientation 102 of the LC molecules in the vicinity of the second substrate 22, and the inclined directions 201 and 202 of the birefringence of the phase compensating plates 24 and 25 are aligned with one another.

The polarizing axis 301 of the polarizing plate 11 resides at 45 degrees away from the direction of the LC orientation 101 or 102, and the polarizing axis 302 of the polarizing plate 22 is normal to the polarizing plate 12. The longer axis 400 of the wavelength-dependent compensating plate is aligned with the axial directions 201 and 202 of the phase compensating plates.

In FIG. 14, an electric field is applied between each pixel electrode 27R, 27G or 27B and the common electrode 10 to turn or direct the director of the LC molecules. The LC layer may be either in splay, twist or bend orientation mode such as shown in FIG. 1. The state energy of each orientation mode depends on the applied voltage, and the LC layer 23 assumes the energetic state at which the state energy is at the minimum.

Figure 16:
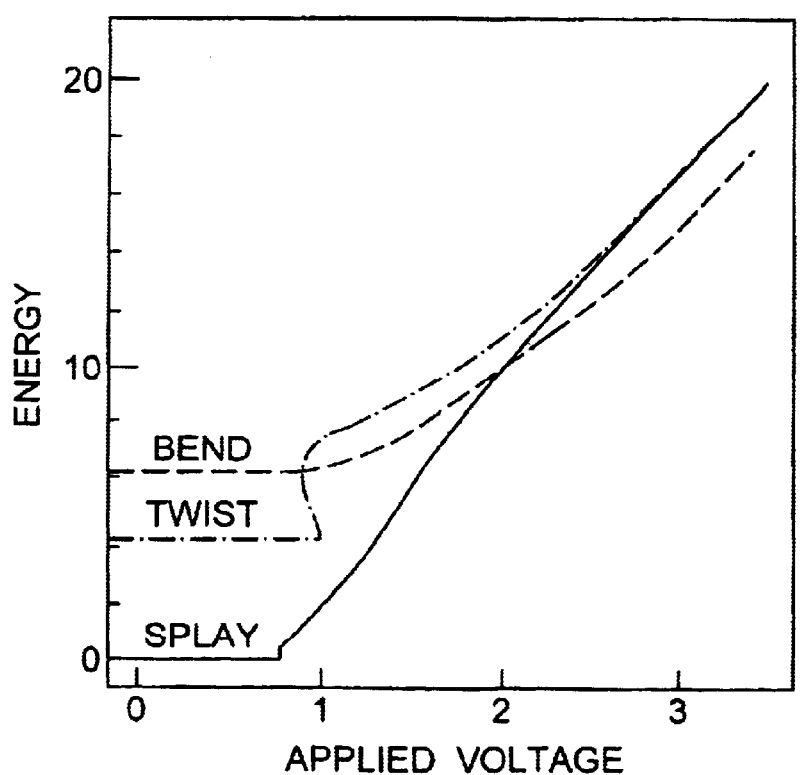
FIG. 16 is a graph showing an energetic relationship between the applied voltage and the orientation of the LC layer for different modes of a parallel orientation arrangement.

Referring to FIG. 16, there are shown state energies for the bend, twist and splay orientation arrangements of the LCD device. The bend orientation has a minimum among these orientations during an applied voltage above 2 volts, exhibiting the most stable state. Thus, the OCB mode, which requires that the LC layer reside in the bend orientation arrangement, can be used above an applied voltage of 2 volts The OCB mode LCD device of the present embodiment has electric characteristics as detailed below. The OCB mode is such that a picture image is displayed by controlling the birefringence of the LCD device. The overall retardation "R" when a specified voltage is applied to change the directions of the directors is obtained from the equation (1) based on the retardation Rlc of the LC layer and the retardation Rrf of the phase compensating plate, whereas the intensity of transmitted light "I" is obtained from equation (2), as discussed before.

Figure 17:
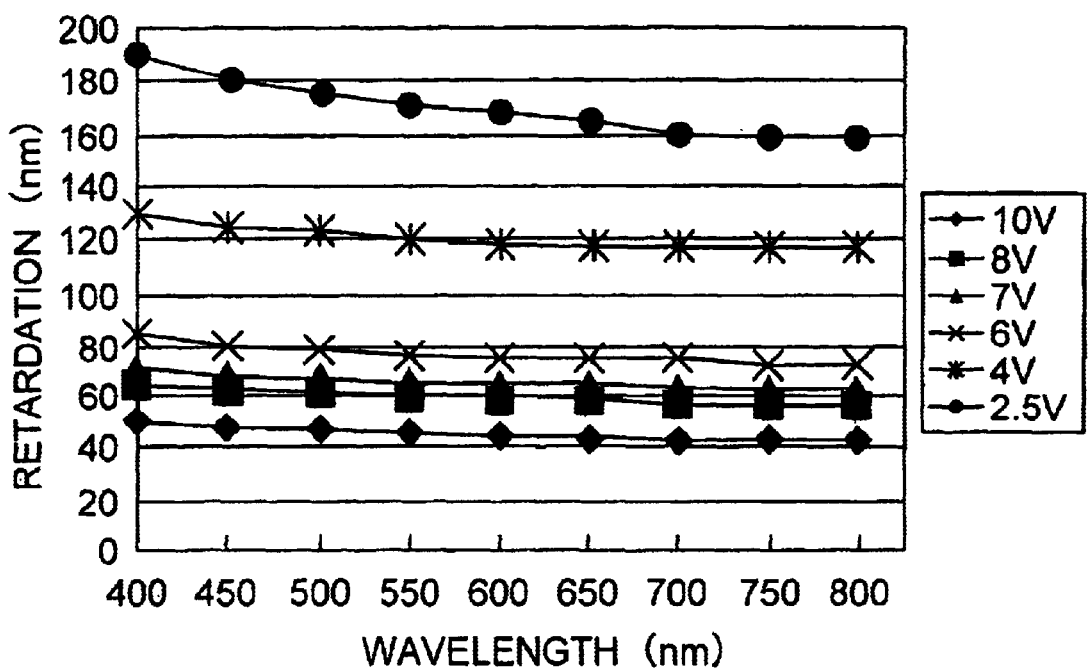
FIG. 17 is a graph showing an applied voltage and wavelength dependency of the retardation in the OCB mode LCD device of the embodiment before the phase compensating plate and the wavelength-dependent compensating plate are provided.
Figure 18:
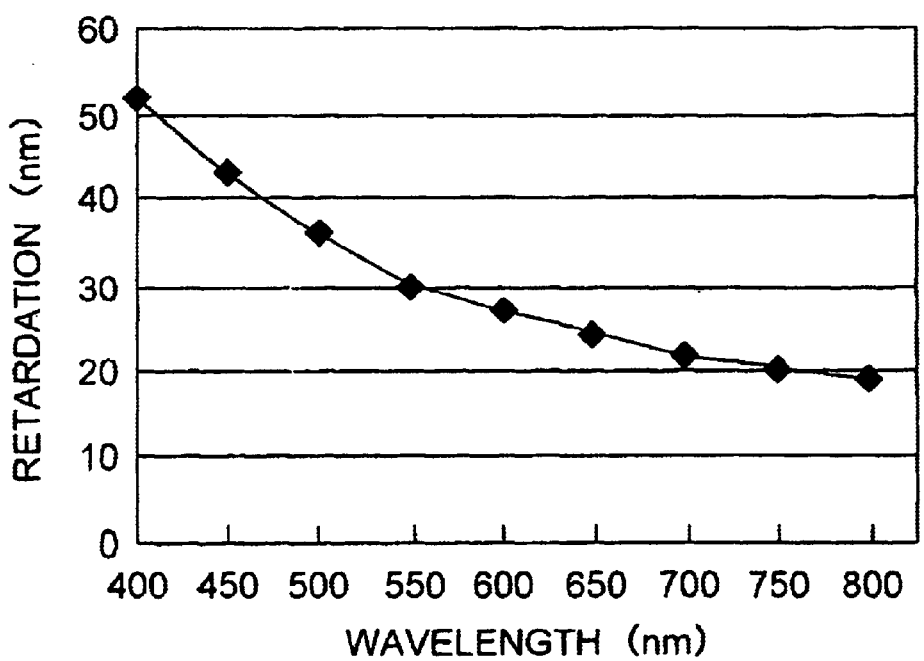
FIG. 18 is a graph showing a wavelength dependency of the retardation of the phase compensating plate having a hybrid orientation arrangement and a negative birefringence in the OCB mode LCD device of the embodiment.
Figure 19:
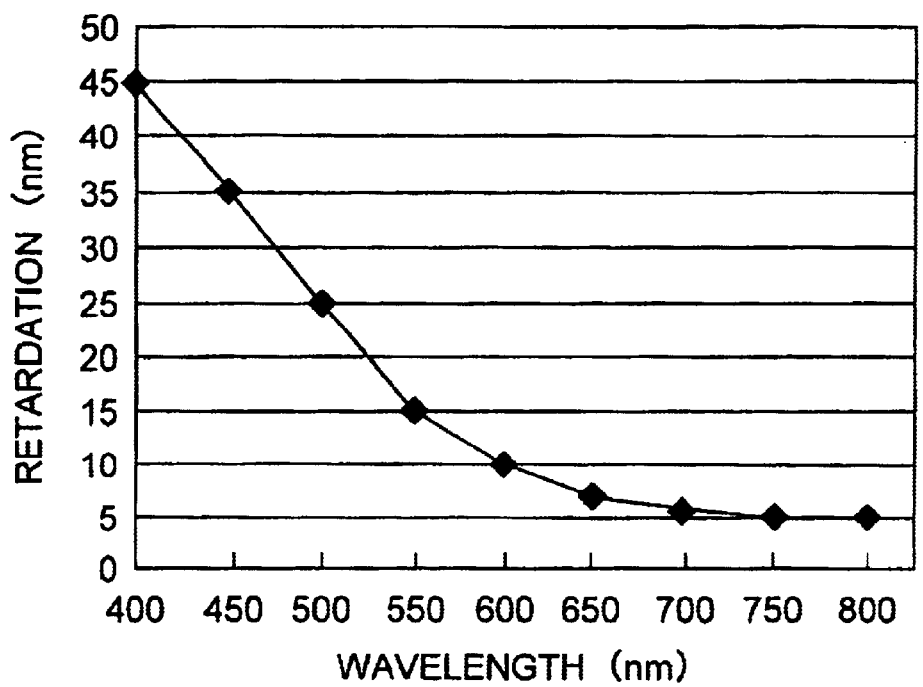
FIG. 19 is a graph showing a wavelength dependency of the retardation of the wavelength-dependent compensating plate in the OCB mode LCD device of the embodiment.

FIG. 17 shows the wavelength dependency of the retardation with the applied voltage being a parameter. The wavelength dependency of the retardation of the phase compensating plate having a hybrid orientation arrangement and a negative birefringence is shown in FIG. 18. The wavelength dependency of the retardation of the wavelength-dependent compensating plate made of tri-acetyl-cellulose is shown in FIG. 19.

Figure 20:
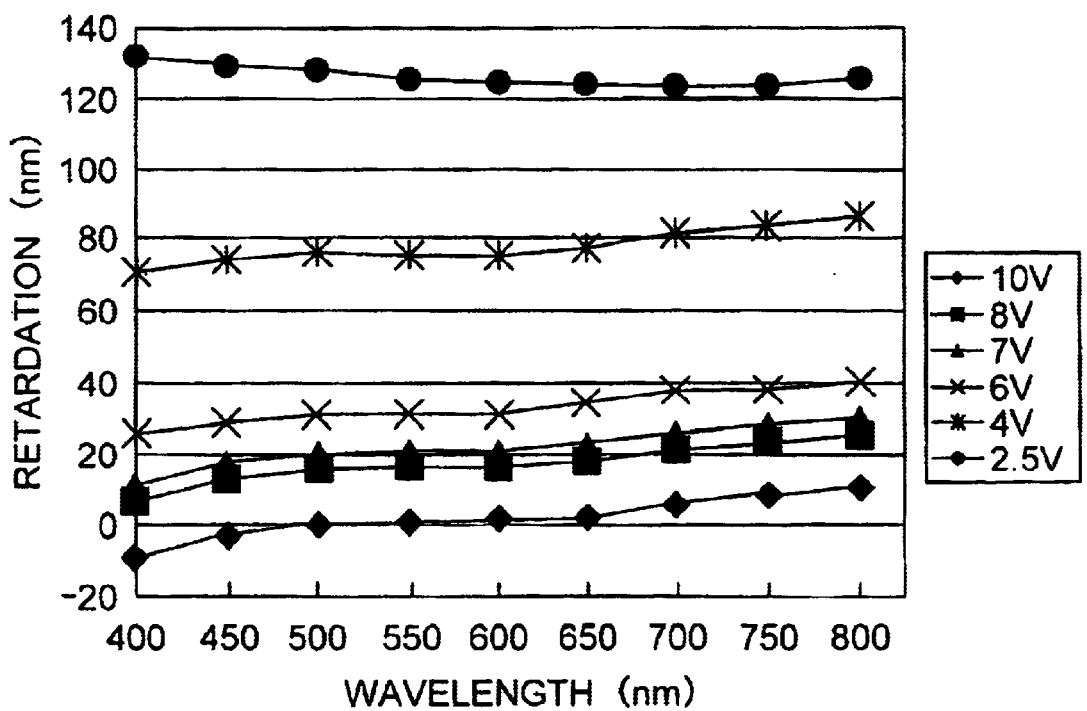
FIG. 20 is a graph showing the overall retardation of the OCB mode LCD device of the embodiment.

Thus, the overall retardation of the OCB mode LCD device of the present embodiment follows the graph shown in FIG. 20, wherein the retardation has a smaller wavelength dependency compared to the retardation in the conventional OCB mode LCD device. In FIG. 20, the brightness assumes a minimum at 10 volts to exhibit a black color. The minimum brightness is comparable to the brightness in the LCD device including a phase compensating plate having a hybrid orientation arrangement and a negative birefringence, thereby providing a higher contrast. The brightness transmittance assumes a minimum at an applied voltage of 7 volts, and the minimum brightness transmittance is comparable to the TN mode LCD device, thereby providing a higher contrast. Although a higher applied voltage is needed in the present embodiment, the applied voltage itself can be reduced by employing a liquid crystal having a higher dielectric anisotropy.

Figure 8:
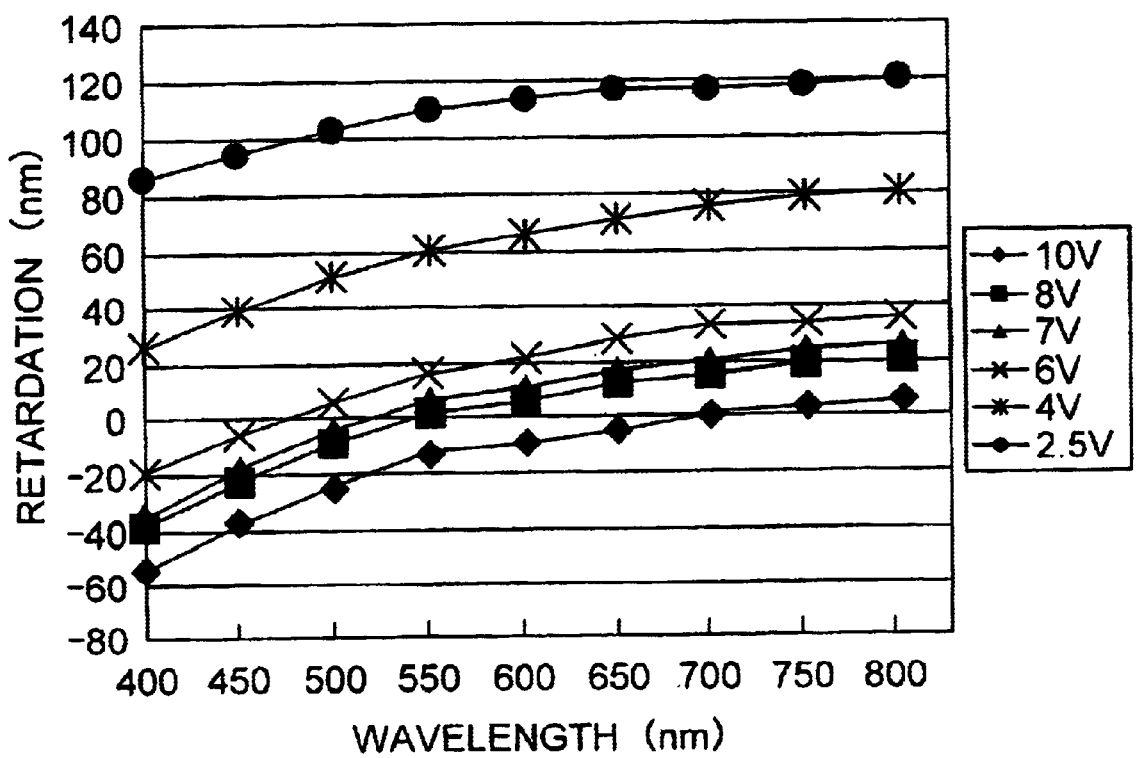
FIG. 8 is a graph showing a wavelength dependency of the retardation, with the cell voltage applied to a LC cell having a bend orientation arrangement being a parameter.
Figure 10:
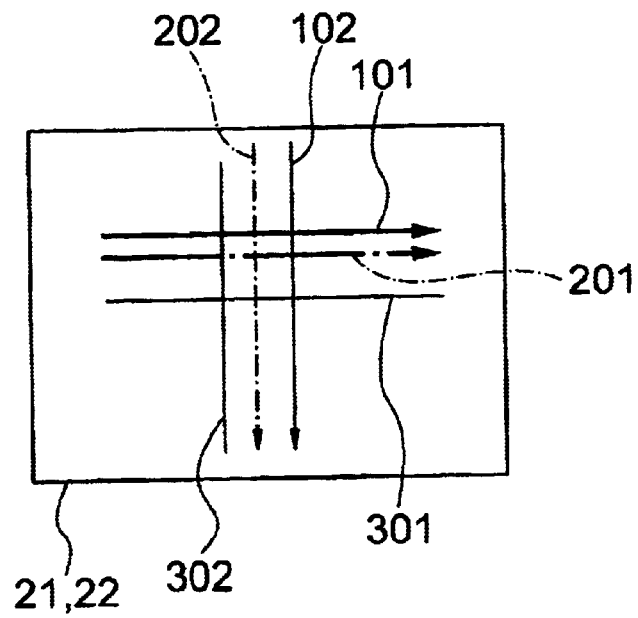
FIG. 10 is a schematic chart showing the axial directions of LC layer, phase compensating plate and polarizing plate in a TN mode LCD device.
Figure 11:
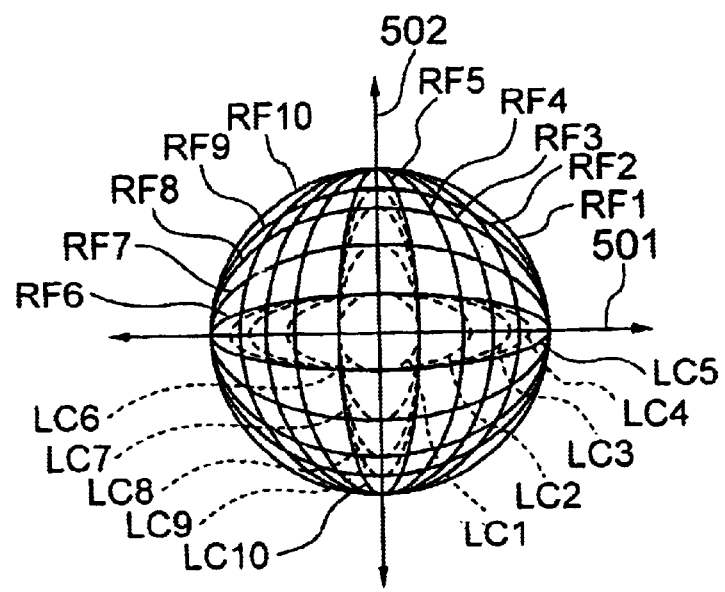
FIG. 11 is a schematic chart showing the birefringence in the TN mode LCD device as viewed from the front.
Figure 12:
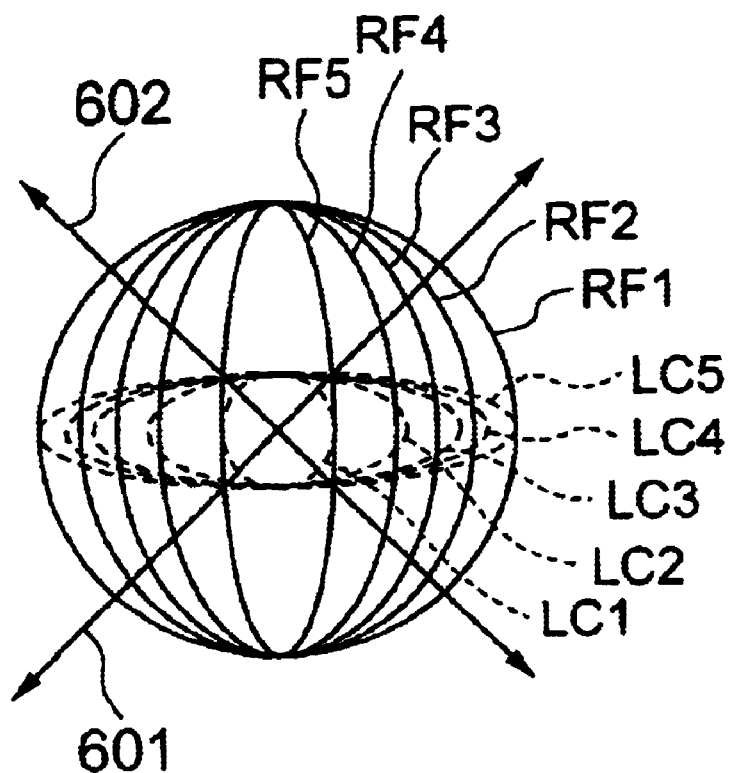
FIG. 12 is a schematic chart showing the birefringence in the conventional OCB mode LCD device as viewed from the front.
Figure 13:
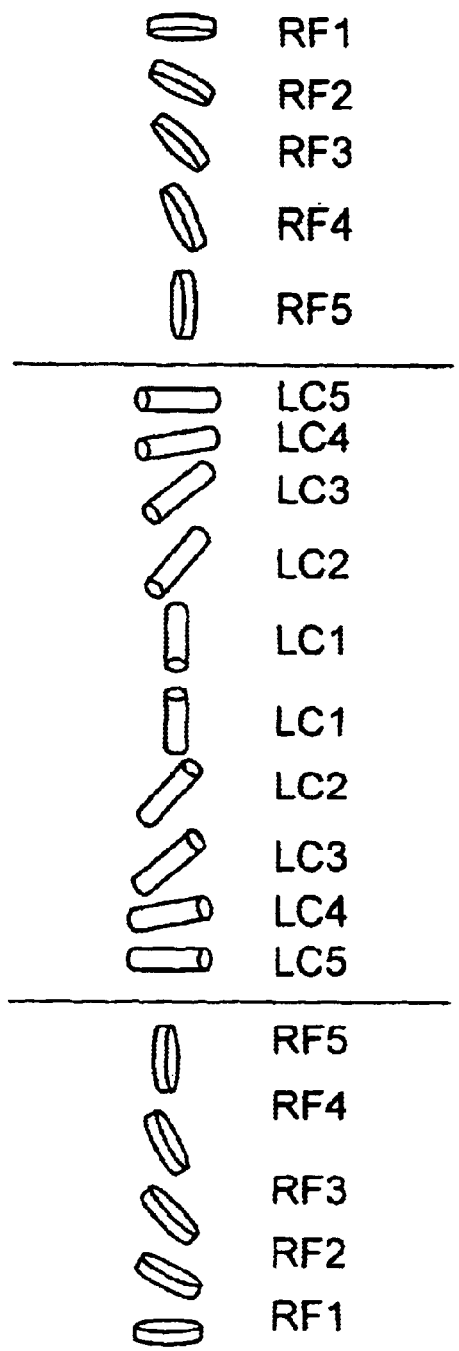
FIG. 13 is a schematic chart showing a sectional arrangement in the birefringence of the LC layer and the phase compensating plate in a LCD device including a LC cell having a parallel orientation arrangement and a phase compensating plate.

In the above embodiment, as described above, a wavelength-dependent compensating plate 150 made of polycarbonate wherein the retardation decreases with the increase of the wavelength is used in the LCD device (a combination of LC layer and the phase compensating plates) having a characteristic wherein the overall retardation increases with the increase of the wavelength as shown in FIG. 8. In this configuration, the longer axis of the birefringence of the wavelength-dependent compensating plate is aligned with the orientation of the LC molecules for compensation of the wavelength dependency, as shown in FIG. 15.

Figure 21:
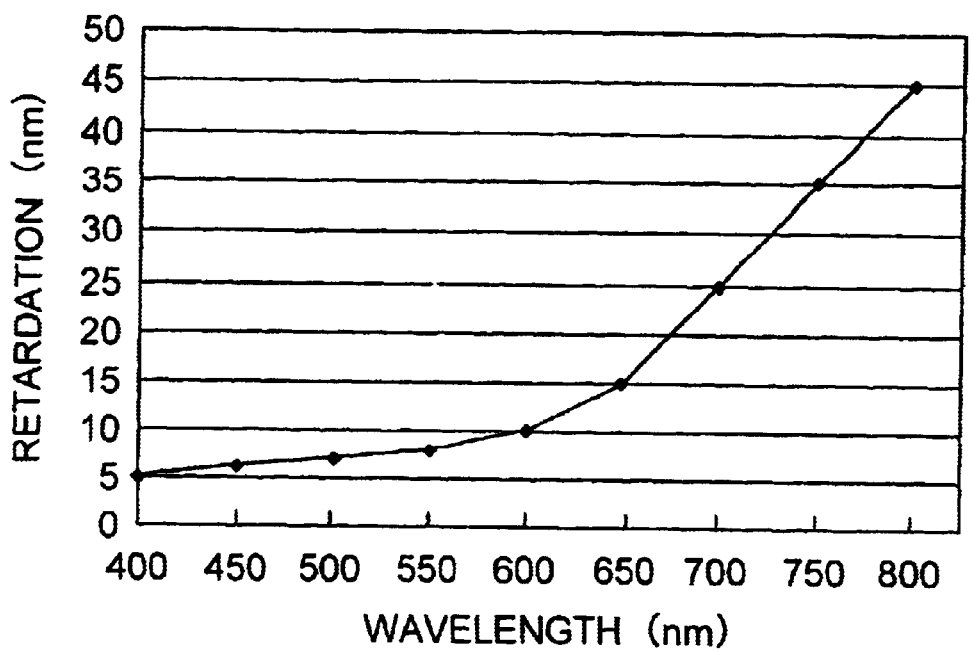
FIG. 21 is a graph showing the wavelength dependency of the retardation of the wavelength-dependent compensating plate in the OCB mode LCD device of the embodiment.

In an alternative, a wavelength-dependent compensating plate made of tri-acetyl-cellulose wherein the retardation increases with the increase of the wavelength as shown in FIG. 21 can be used with the longer axis of the birefringence thereof being normal to the orientation of the LC layer for compensation.

Figure 22:
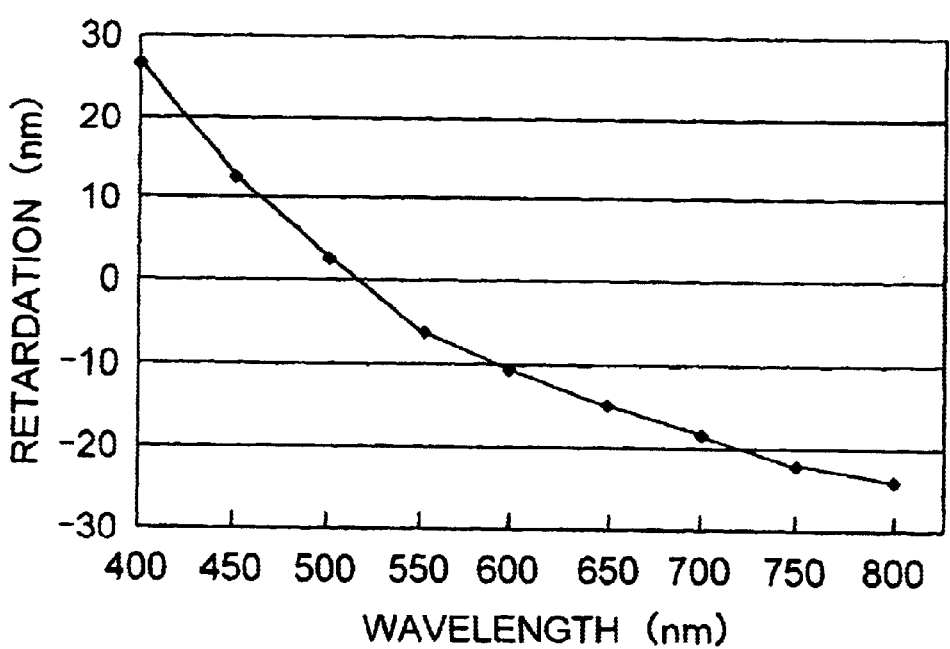
FIG. 22 is a graph showing the wavelength dependency of the retardation of the OCB mode LCD device of the embodiment before the wavelength-dependent compensating plate is provided.

In a further alternative, a wavelength-dependent compensating plate wherein the retardation increases with the increase of the wavelength as shown in FIG. 21 can be used for a LCD device having a characteristic wherein the retardation decreases with the increase of the wavelength as shown in FIG. 22, with the longer axis of the birefringence being aligned with the orientation of the LCD device. In a further alternative, a wavelength-dependent compensating plate wherein the retardation decreases with the increase of the wavelength can be used for a LCD device having a characteristic wherein the retardation decreases with the increase of the wavelength as shown in FIG. 22, with the longer axis of the birefringence being normal to the orientation of the LCD device.

Thus, the present embodiment achieves a higher contrast compared to the conventional OCB mode LCD device.

In the above embodiment, the OCB mode LCD device may have a single phase compensating plate.

Since the above embodiments are described only for examples, the present invention is not limited to the above embodiments and various modifications or alterations can be easily made therefrom by those skilled in the art without departing from the scope of the present invention.

What is claimed is:

1. A LCD device comprising:
   first and second substrates opposing each other, a LC-layer sandwiched therebetween for allowing transmission of light therethrough;
   an electrode assembly for defining a plurality of pixel areas on said second substrate, biaxial phase compensating plates mounted by one of said first or second substrates, and the
   a single uniaxial wavelength-dependent compensating plate mounted by either one of said first or second substrates;
   wherein said wavelength compensating plate compensates a wavelength dependency of an overall retardation effected by said LC layer; and
   wherein said phase compensating plates obtain a substantially constant retardation with respect to different wavelengths of the transmittal light.

2. The LCD device as defined in claim 1, wherein said LC layer has a bend orientation arrangement between said first substrate and said second substrate.

3. The LCD device as defined in claim 1, wherein said LC layer has a parallel orientation arrangement between said first substrate and said second substrate.

4. The LCD device as defined in claim 1, wherein said phase compensating plate has a negative birefringence.

5. The LCD device as defined in claim 1, wherein said phase compensating plate is bi-axial.

6. The LCD device as defined in claim 1, wherein said phase compensating plate has a hybrid orientation arrangement and a negative birefringence.

7. The LCD device as defined in claim 1, wherein said wavelength-dependent compensating plate is a uni-axial phase contrast plate.

8. The LCD device as defined in claim 1, wherein said wavelength-dependent compensating plate has a property wherein a retardation of said wavelength-dependent compensating plate reduces with an increase of a wavelength of the transmitted light.

9. The LCD device as defined in claim 8, wherein said wavelength-dependent compensating plate includes polycarbonate.

10. The LCD device as defined in claim 1, wherein said wavelength-dependent compensating plate has a property wherein a retardation of said wavelength-dependent compensating plate increases with an increase of a wavelength of the transmitted light.

11. The LCD device as defined in claim 10, wherein said wavelength-dependent compensating plate includes tri-acetyl-cellulose.

12. The LCD device as defined in claim 1, further comprising another phase compensating plate mounted by said one or the other of said first and second substrates.

13. The LCD device as defined in claim 12, further comprising another wavelength-dependent compensating plate mounted by said one or the other of said first and second substrates.

* * * * *

UNITED STATES PATENT AND TRADEMARK OFFICE
CERTIFICATE OF CORRECTION

PATENT NO.   : 6,665,032 B1
DATED        : December 16, 2003
INVENTOR(S)  : Kikkawa It is certified that error appears in the above-identified patent and that said Letters Patent is hereby corrected as shown below:

Column 10,
Line 42, "substrates, and the" should be -- substrates, and the other mounted on the other of said first or second substrates; --.

Signed and Sealed this

Thirteenth Day of April, 2004

JON W. DUDAS
*Acting Director of the United States Patent and Trademark Office*